J. BERRY.

Assignor to the NATIONAL NEEDLE Co.

Art of Polishing the Eyes of Machine Needles.

No. 8,350. Reissued July 23, 1878.

Witnesses
H. A. Chapin
Wm H. Chapin

Inventor
John Berry

N. PETERS, PHOTO-LITHOGRAPHER, WASHINGTON, D. C.

UNITED STATES PATENT OFFICE.

JOHN BERRY, OF SPRINGFIELD, MASSACHUSETTS, ASSIGNOR TO THE NATIONAL NEEDLE COMPANY, OF SAME PLACE.

IMPROVEMENT IN THE ART OF POLISHING THE EYES OF MACHINE-NEEDLES.

Specification forming part of Letters Patent No. 165,532, dated July 13, 1875; Reissue No. 8,350, dated July 23, 1878; application filed August 20, 1877.

DIVISION B.

*To all whom it may concern:*

Be it known that I, JOHN BERRY, of Springfield, county of Hampden, and State of Massachusetts, have invented a new and useful Process for Polishing the Eyes of Sewing-Machine Needles, which process is fully set forth in the following specification and in the accompanying drawing.

My invention relates to a process for polishing the eyes of sewing-machine needles which results in a great saving in labor by providing ready and convenient means for handling needles in considerable groups, and, furthermore, for retaining all of the needles in any one of said groups in a fixed position during the different operations required to be performed upon them, so that certain movements and operations which have heretofore been expended upon one needle at a time are made to embrace thirty or more; also, in the employment of such needle-eye-polishing machines as have been heretofore made, the processes employed in working them have required that much of the time of the polisher which should have been expended in the work of polishing proper has been required for threading the needles onto the polishing-thread, said threads having been secured by one end to the machine.

By my process the threading is done away from the polishing-machine by cheap labor, and the polisher can consequently be kept constantly at work at his proper employment.

Figure 2:
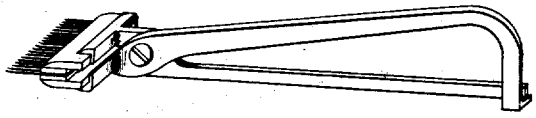
Figure 2 is a pair of transfer-tongs, the jaws of which are lined with leather or other similar substance which will permit of firmly grasping the needles and holding them so they will retain their regular proper position therein.
Figure 1:
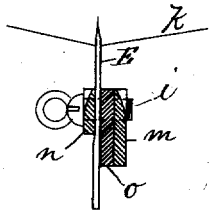
Fig. 1 is a transverse section of the clamp, Fig. 3, midway its length.
Figure 3:
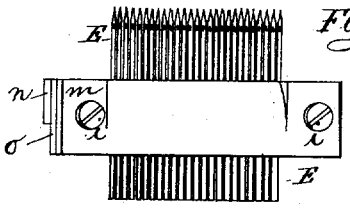
Fig. 3 represents a needle-clamp composed of two metallic strips, *n m*, with a strip of leather, *o*, or other suitable material, for firmly pressing the needles therein between them, all being secured together and kept in place by two screws, *i i*. E E is a group of needles secured in the clamp.

The operation of my invention is as follows: The needles are first fixed in a holder, one by one, with all the eyes in the same relative position, and from thence they are taken by the tongs, Fig. 2, a large quantity at a time, by grasping them between the jaws thereof. The clamp, Fig. 3, is now sufficiently loosened by turning back the screws *i i* to permit of passing the group of needles taken by the tongs from the holder, points first, into the clamp between the leather *o* and one of the metallic strips *n m*, where they are firmly secured by turning down screws *i i*, after which the tongs are unloosened from the needles, and they stand in the clamp with their eyes at right angles to the length thereof, as seen in Fig. 1.

The next operation consists in taking the clamp and its group of needles therein and threading each needle with the polishing-threads *k*. These threads are cut into uniform lengths for convenience in handling, and as soon as a group of needles has been threaded it is passed to the polisher with the threads hanging in the eyes of the needles. The polisher takes the clamp with its needles and threads, and, securing the ends of the threads in my eye-polishing machine, as shown and described in my patent therefor, dated July 13, 1875, he applies emery or other suitable polishing material to the threads, and the clamp, with the needles therein, is seized with the hands and moved to and fro rapidly on the threads, and all the eyes of the group are simultaneously polished. This last operation is the essential one of all, and upon the possibility of giving the polishing-threads the right direction through the eyes of the needles, or of turning the group of needles in all requisite directions as they are passed back and forth upon the threads, depends largely the perfection of the finish of the eyes, and consequently the value of the needle itself when put into a sewing-machine to perform its proper functions.

Machines have been made for polishing needle-eyes in which attempts have been made to produce mechanically a motion which should carry the group of needles through the varying positions and angles which this work demands, in order to cause the polishing-threads to work with equal effectiveness on all the surface of the eyes; and in order to accomplish this, the polisher must of necessity be free to turn the clamp in any direction as he passes it back and forth under the polishing-threads, thus causing the threads to draw over all of the surface and entirely around the edges of the needle-eyes. This last operation completes the eye-polishing.

I am aware that it is not new to clamp a series of needles rigidly in a clamp with their points all in one direction, and give to said clamp and needles by mechanical devices a reciprocating and a rocking motion upon polishing-threads drawn through their eyes, and I do not claim such devices; but

What I claim as my invention is—

The improvement in the art of polishing the eyes of needles which consists in first arranging a series of needles with their points and eyes in the same direction, retaining them firmly in position in a hand-clamp, which permits of handling said hand-clamp and said series of clamped needles together, so that the polishing-threads may be passed through the eyes of the needles while so held, and in reciprocating the whole series by hand upon said polishing-threads, so as to simultaneously polish all of the surface of the eyes, substantially as set forth.

JOHN BERRY.

Witnesses:
H. A. CHAPIN,
WM. H. CHAPIN.